United States Patent [19]

Johnson

[11] 4,202,201
[45] May 13, 1980

[54] ISOLATION AND DUST SEALING DOOR ASSEMBLIES WITH INTEGRAL TESTING MEANS

[76] Inventor: Andrew P. Johnson, 1620 Kensington Rd., Bloomfield Hills, Mich. 48013

[21] Appl. No.: 900,564

[22] Filed: Apr. 27, 1978

Related U.S. Application Data

[63] Continuation-in-part of Ser. No. 711,219, Aug. 3, 1976, Pat. No. 4,114,424.

[51] Int. Cl.² ............................................. G01M 3/32
[52] U.S. Cl. ........................................ 73/40; 220/232
[58] Field of Search .................... 73/40, 46, 49.8; 114/117, 201 A, 201 R; 277/2; 220/232, 239, 85 R, 387; 49/477, 483

[56] References Cited

U.S. PATENT DOCUMENTS 2,345,387  3/1944  Elsey ........................................ 73/40

Primary Examiner—Gerald Goldberg
Assistant Examiner—Joseph W. Roskos
Attorney, Agent, or Firm—Dolgorukov & Dolgorukov

[57] ABSTRACT

The specification discloses an isolation door assembly which, by virtue of having annuli provided about the joint between the door coaming and the door framing, about the seal between the door and the coaming, and about any penetration of the door by shafts, etc. provides the means to test the door assembly at installation, and at specified testing intervals.

By providing pressure fittings (normally plugged) which communicate with the annuli described above, and introducing a testing medium under pressure into said annuli, the integrity of all door seals can be tested.

26 Claims, 31 Drawing Figures

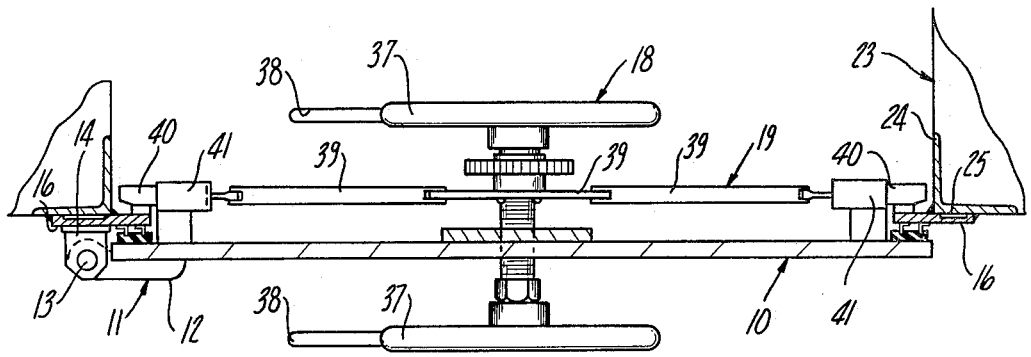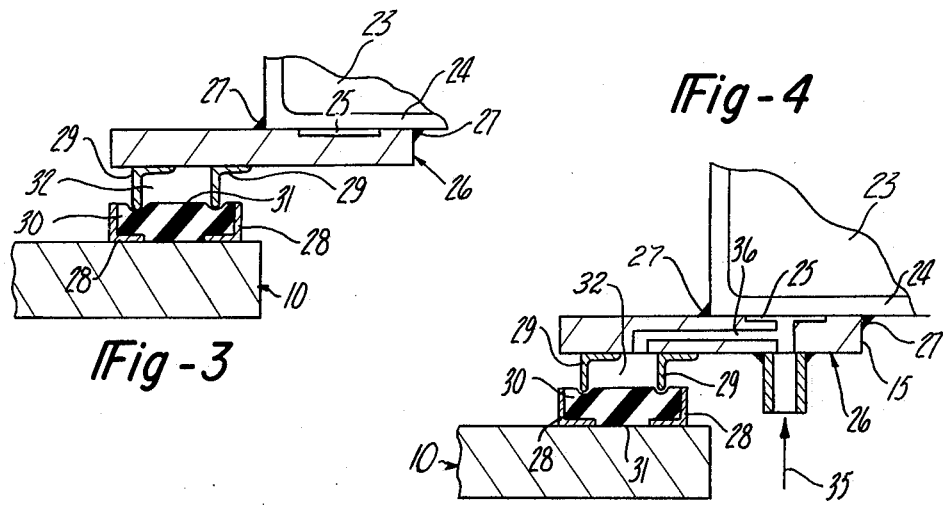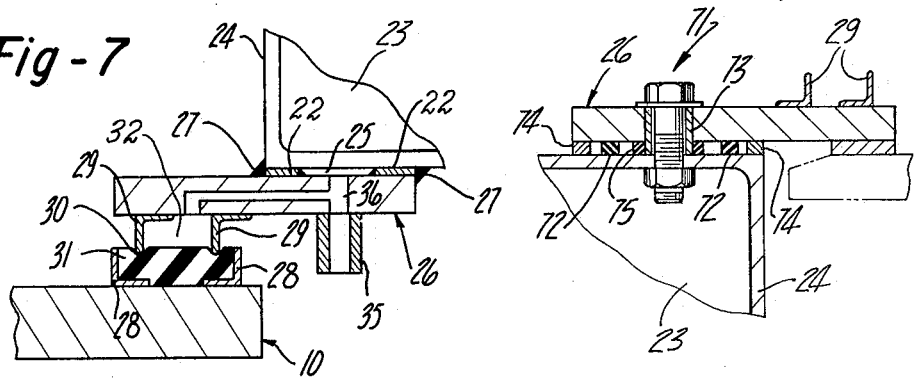

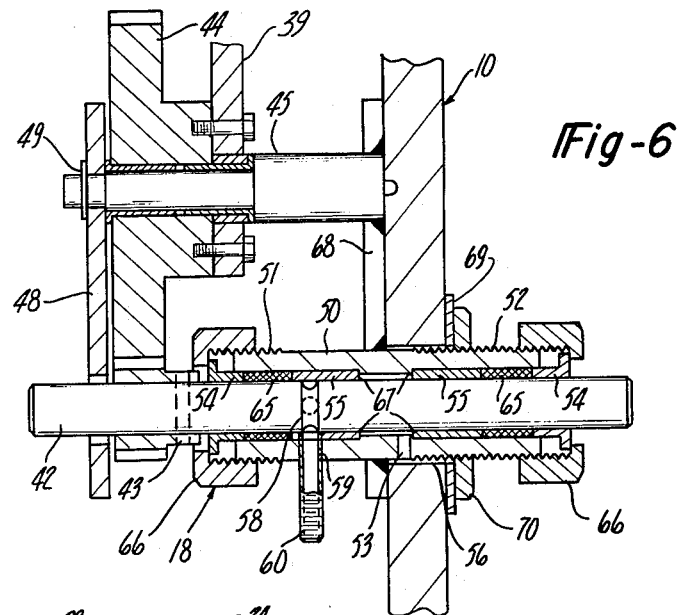
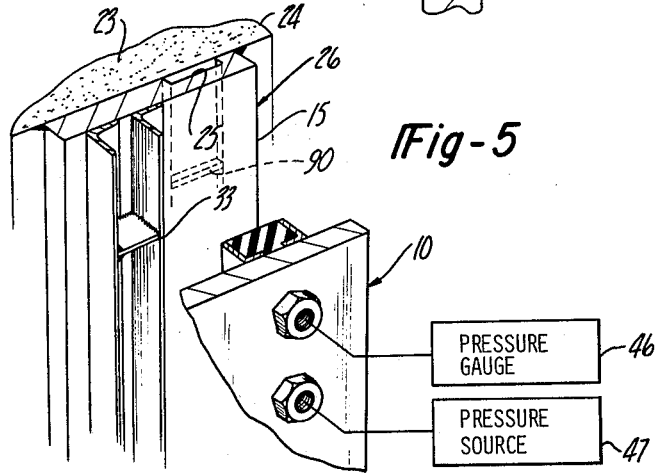

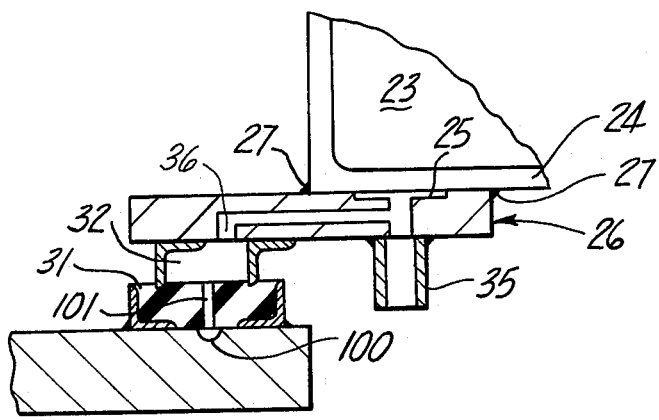
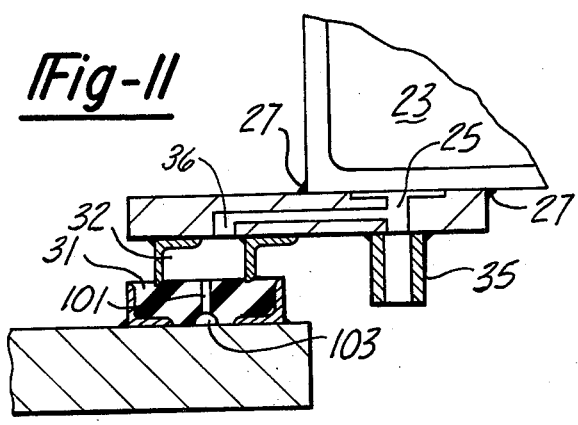
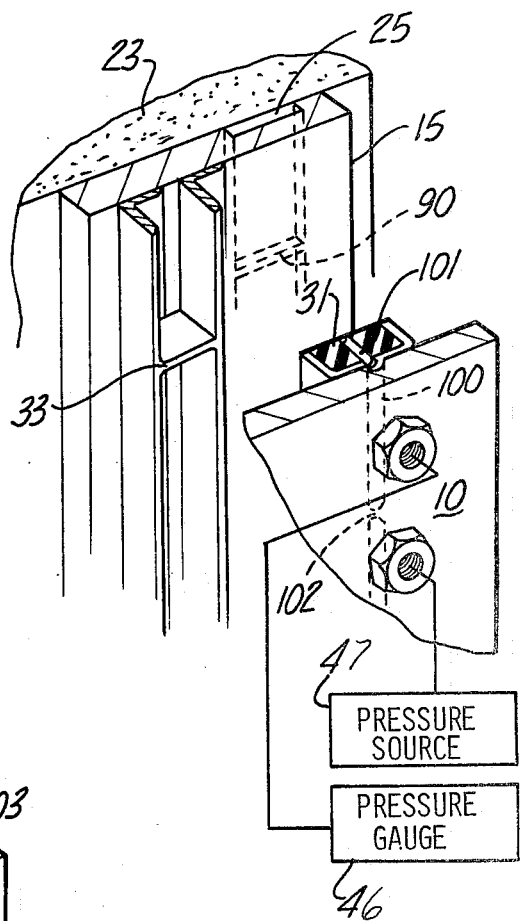
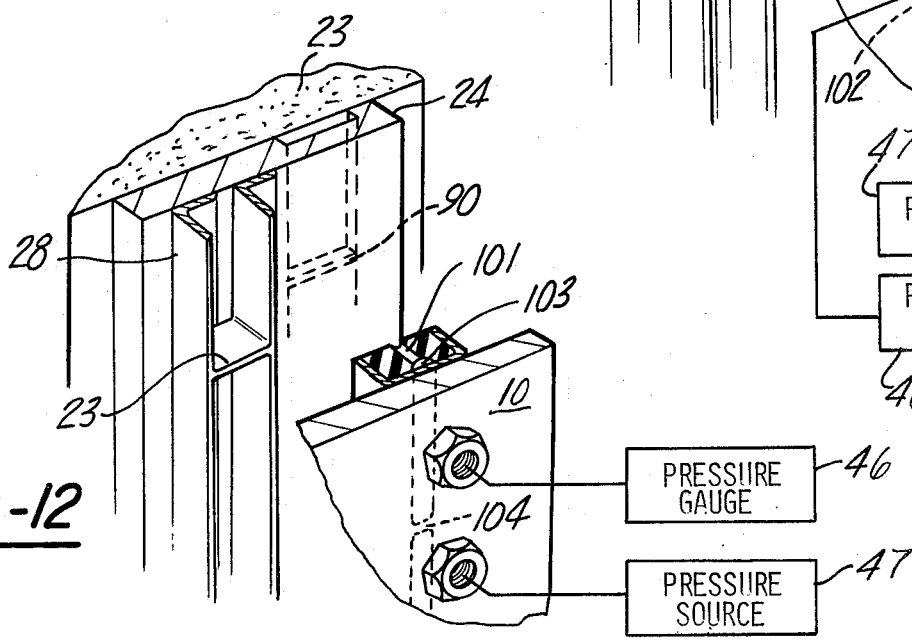

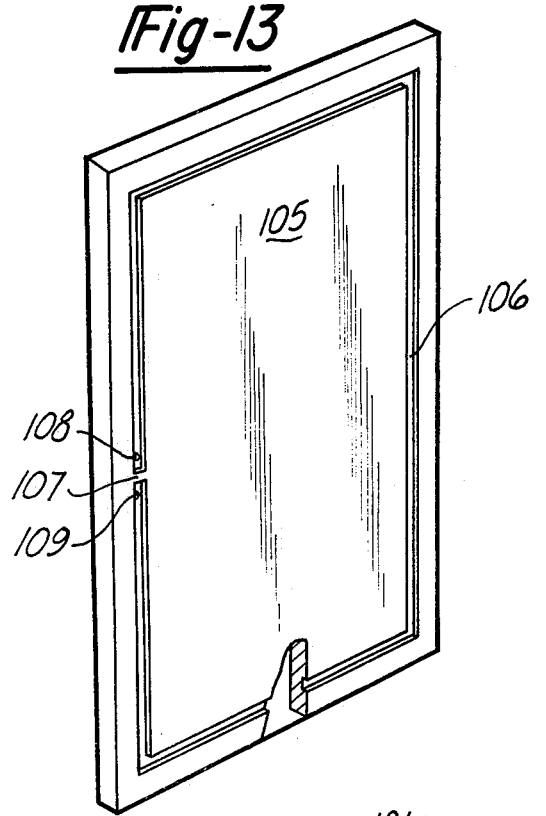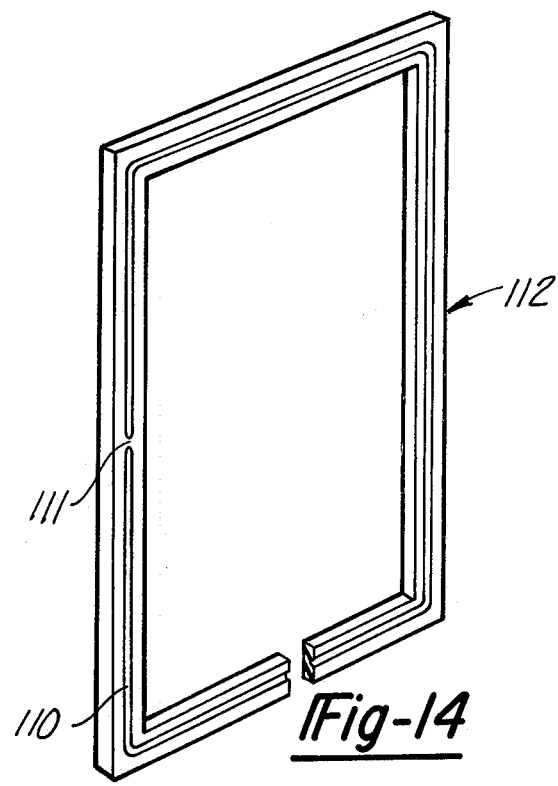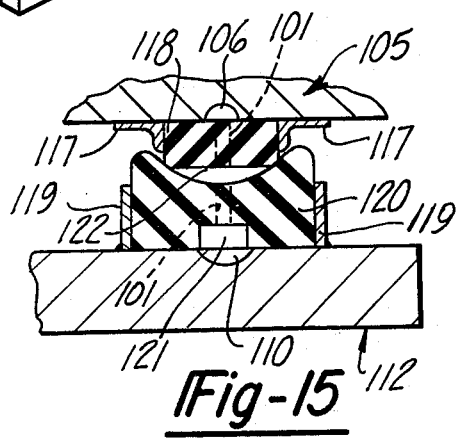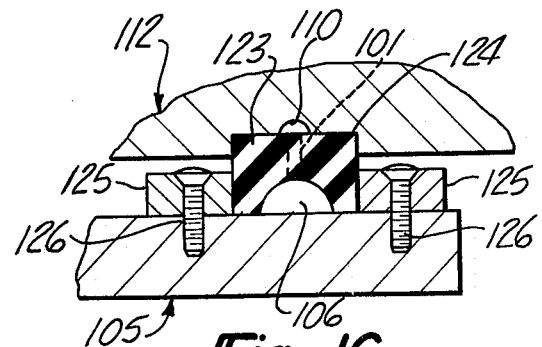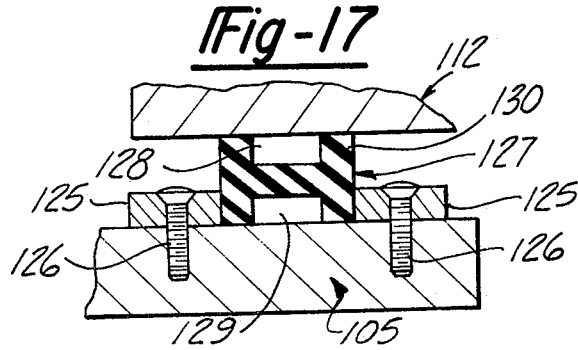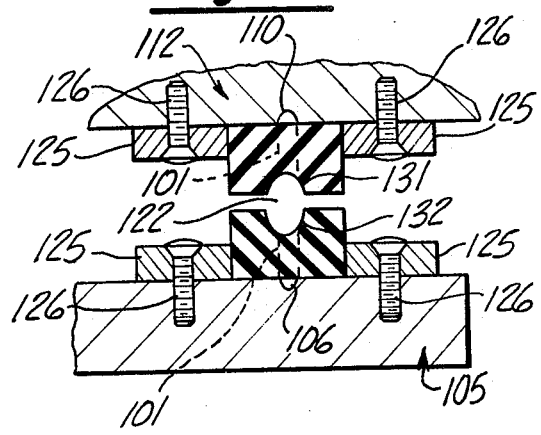

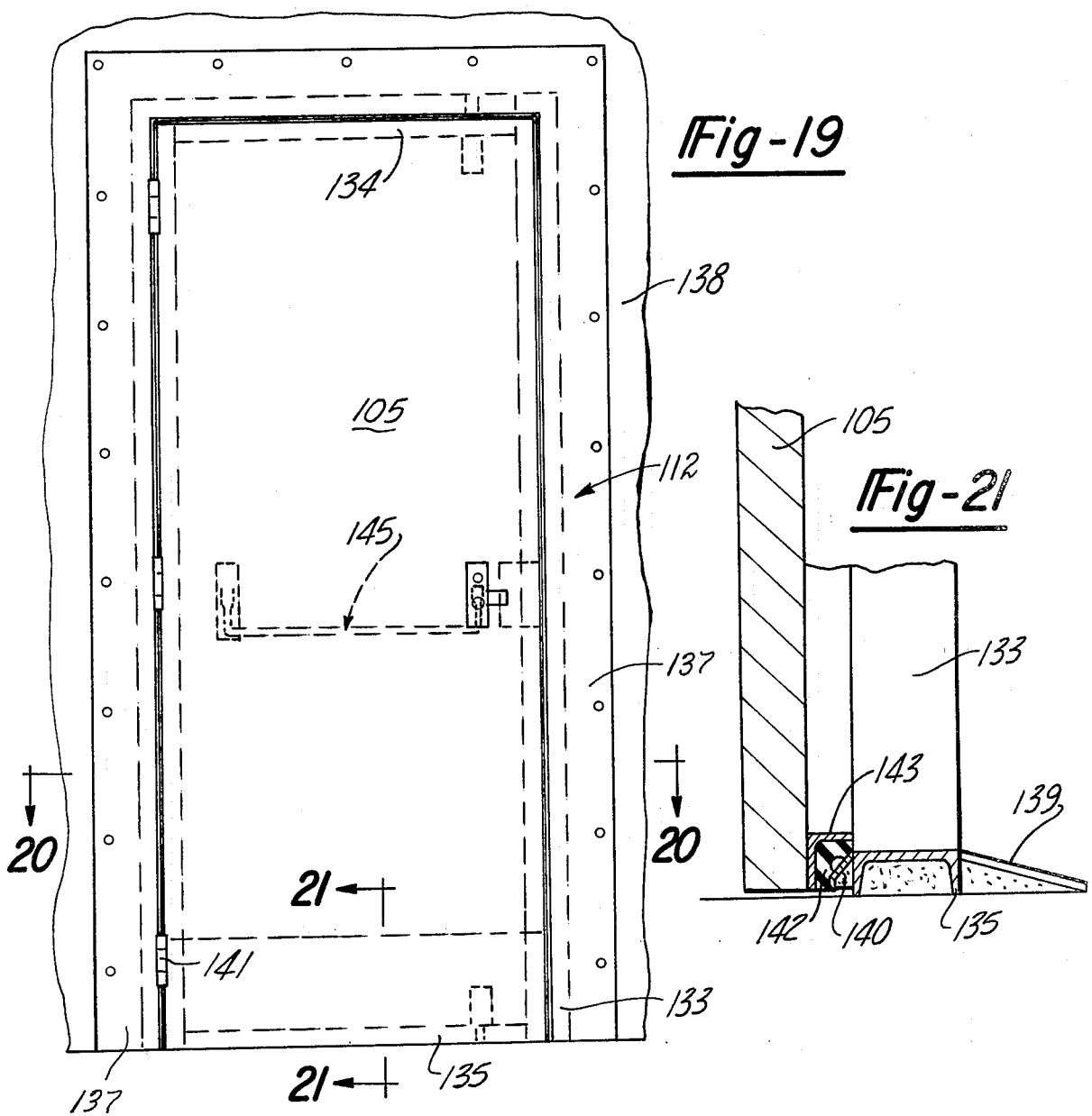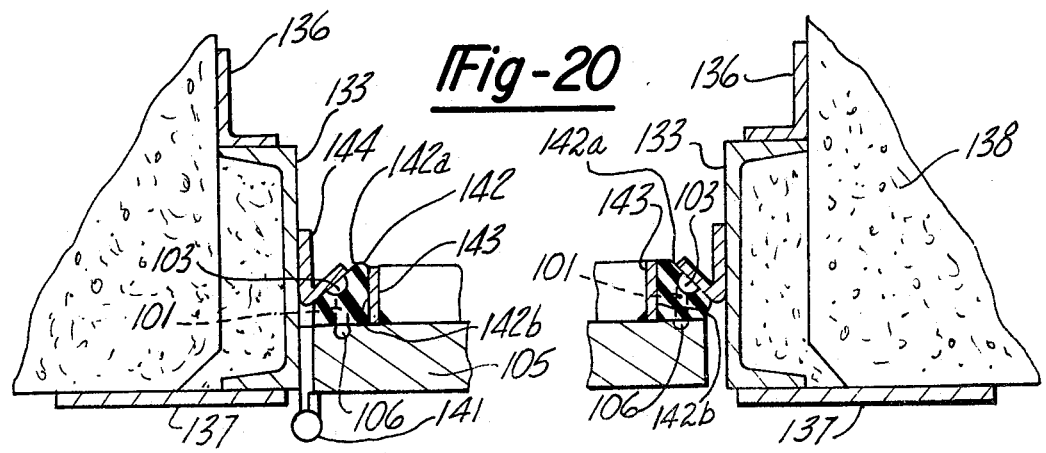

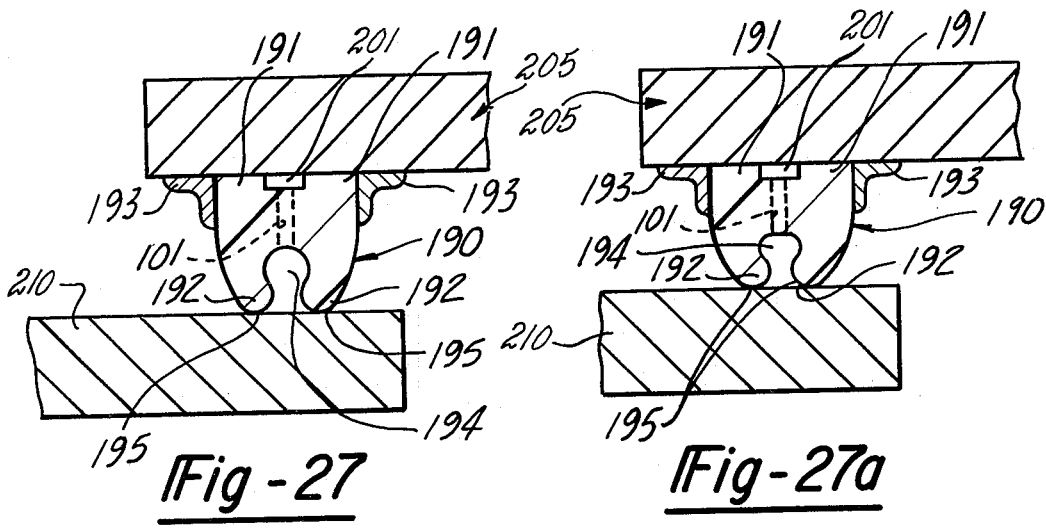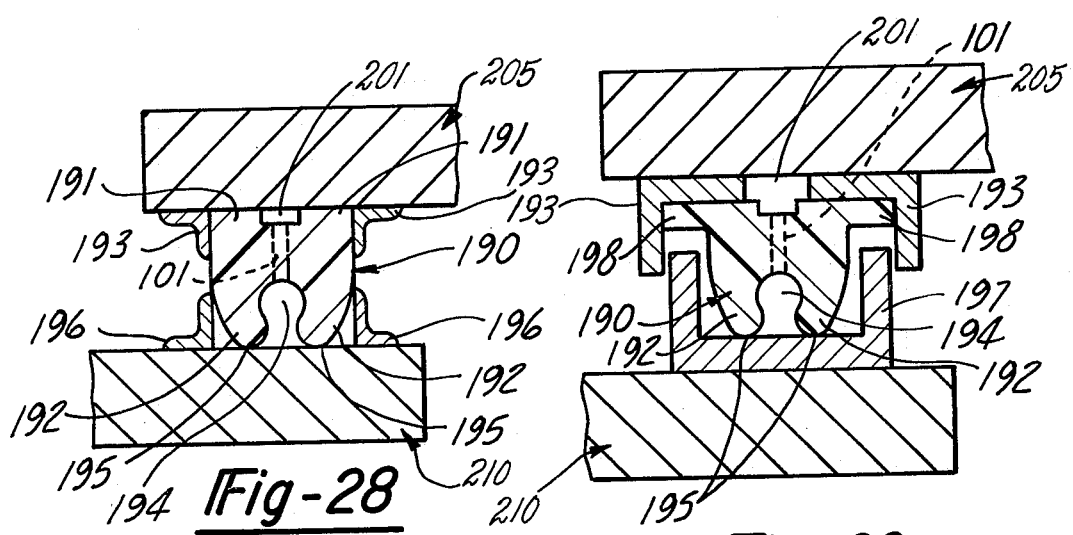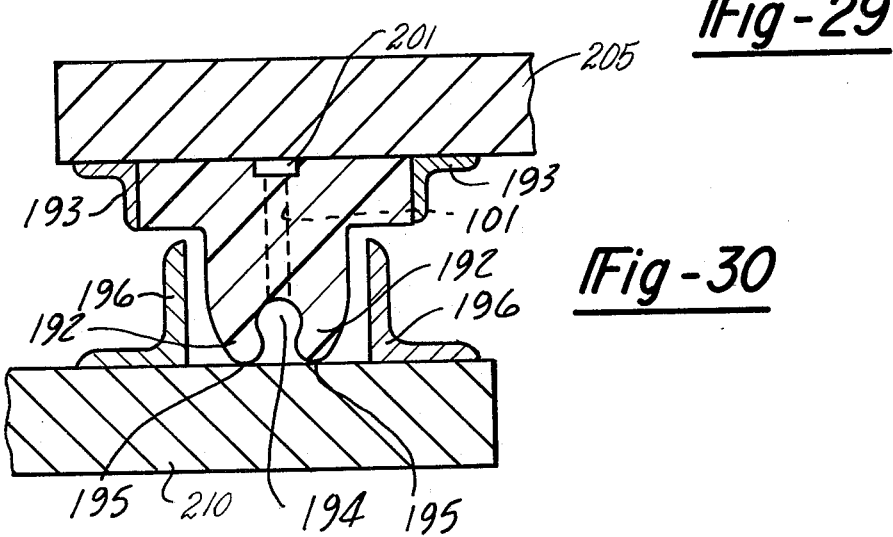

ial application, Ser. No.
ISOLATION AND DUST SEALING DOOR ASSEMBLIES WITH INTEGRAL TESTING MEANS The present application is a continuation-in-part of my earlier co-pending patent application, Ser. No. 711,219, filed Aug. 3, 1976, now U.S. Pat. No. 4,114,424, for a "Gas-Fluid-Sound Isolation Door Assembly With Integral Testing Means".

This invention relates to an isolation door assembly in general, and more particularly to such assemblies with integral testing means. A serious problem has existed ever since the occurrence of the need for chambers to be sealed with isolation doors. This problem involves how to ensure the integrity of the door not only during installation, but also during the use of the article on which the door is installed.

It should be understood that whenever the term "isolation door" is used, it is to mean a door capable of isolating an environment of gas, fluid, or sound on one side of the door from an environment of gas, fluid, or sound on the opposite side of the door. Also, a combination of gas, fluid, or sound may be present on either side of said door.

For example, if an isolation door is installed in a watertight bulkhead on a ship, how does one make sure the door, as installed, is watertight without undue expense, and how does one continue to check on its watertight integrity as it is used? To present this problem on a more easily imaginable scale, one may consider the watertight doors used on smaller container vessels such as pressure vessels, or nuclear reactors and the like.

These doors, for obvious reasons, must be tight, and must maintain their integrity during severe operating conditions for an extended length of time, and it must be possible to prove that they remain tight at varying inspection periods.

Up until the present time there have been only two methods of testing isolation doors, both of which are totally unsatisfactory for reasons to be explained.

The first and most obvious means of testing is to close the door and to fill the interior of the chamber which it is intended to seal, and then check for leakage.

The other method is to perform the reverse kind of test, where the chamber is too large to be filled from the inside. In this case, one builds a tank large enough to engulf the door in the medium being tested, somehow attaches such a tank to the outside of the door, and then tests for leakage.

If the chamber is rather small, either one of these tests will work satisfactorily, whether the testing is done at installation or at certification intervals of perhaps every six months or a year. When the chamber is large, such as in a ship or in the aforementioned nuclear plants, the process becomes completely impractical.

In one case with which I am personally familiar, a nuclear reactor is involved, and it is proposed to build a tank costing many thousands of dollars to place over the fluid tight doors which are mounted on the reactor chambers, and then to test for leakage. In addition to involving the expenditure of thousands of unnecessary dollars to build this tank, further waste becomes necessary, as the strength of the door framing must be greatly increased to accommodate the mounting of this tank at periodic intervals.

Obviously, such a situation is completely unsatisfactory and even this method of testing, which is the most advanced to date, may well be impractical in many applications.

Thus, through the long history in the art of providing watertight doors, there has been no satisfactory method of testing the integrity of such doors.

This does not mean that solutions have not been attempted, as obviously the problem is of long standing and very difficult to solve.

Continuing work in this field led to the conclusion that where large spaces are involved, with correspondingly large watertight doors, an attempt had to be made to get away from trying to test such doors by filling the interior of the chamber, or an exterior space with water.

An attempt was next made to pressurize such areas with air pressure either internally or externally. However, it was found that due to the volume involved, and the obvious difference between the pressure exerted on a seal between a given volume filled with air and one filled with water, that as a practical matter a sufficient air pressure could not be introduced into the testing chamber, whether it was an exterior tank mounted around the fluid tight door, or the entire chamber itself, to exert a sufficient pressure on the seal.

Thus, the next attempt was to provide a smaller area to which the air pressure could be introduced. One such method, where no penetration of the watertight door itself was involved, was to provide an annulus in the sealing surface around the periphery of the fluid tight door.

A coaming would be mounted to the door frame with a U-shaped channel welded around the four sides of the opening which would then bear against a compressable seal provided on the door, and in this way a continuous annulus around the entire opening would be provided. Pressure could be introduced into this opening, and by means of introducing a predetermined air pressure and attaching a pressure gauge and watching for any pressure drop, it could be determined if there was a leak.

Such a system is still used in some instances where there is no penetration of the watertight door, and is thus satisfactory for some purposes.

However, it can be seen that as soon as there is penetration of the watertight door this method becomes entirely unsatisfactory, as while it would test the seal on the outside of the door, none of the penetrations through the door, such as the shaft which commonly connects with the locking mechanism, or any other shafts penetrating through the door would be tested, and there would be little sense in using a method of testing the seal on the outside of the door, when the remainder of the door would still have to be tested by the outdated methods previously discussed.

Thus, one of the objects of the present invention is to provide an improved isolation door assembly which can be used to seal any opening which must remain tight, regardless of size, whereby the difficulties and disadvantages of the prior constructions are overcome and largely eliminated, and a much simpler and durable construction provided.

Another object of the present invention is to provide an isolation door assembly of the foregoing nature which has integral testing means.

Another object of the present invention is to provide an isolation door assembly in which at the same time one can not only test the integrity of the seal around the watertight opening, but can test the integrity of any penetrations through the door and the door coaming in a simple and relatively easy manner.

A further object of the present invention is to provide an isolation door assembly of the above nature which can be used on any size container which must be sealed.

A further object of the present invention is to provide for the sealing of any size chamber at the time of its construction with a relatively simple and inexpensive to manufacture isolation door assembly which also provides for easy retesting of the integrity of the seal at any specified interval without undue expense.

A still further object of the invention is to eliminate the need for testing large chambers by the use of an external tank placed around the door, and thus also to eliminate the additional reinforcement around such doors necessary for mounting such testing apparatus.

Another object of the present invention is to allow for testing of the door seal and penetrations of a door simultaneously.

Another object of the present invention is to provide an isolation door assembly with integral sealing means which is relatively simple and inexpensive to manufacture.

Further objects and advantages of this invention will be apparent from the following description and appended claims, reference being had to the accompanying drawings forming a part of this specification, wherein like reference characters designate corresponding parts in the several views.

FIG. 2 is a sectional view taken in the direction of the arrows on the section line 2—2 of FIG. 1.

FIG. 3 is a view, partially in section, of the portion of FIG. 2 showing the sealing of the isolation door itself when the door is in a closed position, being pressed against the channel welded to the door coaming, and forming the annulus around the outside of the door.

FIG. 4 is a view similar in part to FIG. 3 but showing the door coaming having integral passages provided therein so that upon an introduction of a testing medium through the inlet, both the integrity of the weld fastening the door coaming to the door frame, and the integrity of the door seal will be tested.

FIG. 5 is a partial view of the construction embodying the present invention shown in FIG. 1, showing in enlarged detail the pressure inlet and pressure gauge connections to the door.

FIG. 6 is a sectional view taken in the direction of the arrows on the section line 6—6 of FIG. 1.

FIG. 7 is a view substantially similar to that of FIG. 4, but showing an alternate embodiment of the present invention wherein an annulus is formed around the opening of the door frame by the application of a double row of gasket material before fastening the door coaming to the door frame.

FIG. 8 is a view, also substantially similar to FIG. 4, but showing the coaming attached to the door frame with nut and bolt assemblies and suitable spacers.

FIG. 9 is a view similar in part to FIG. 4 but showing an additional seal annulus provided in the door underneath the gasket with a passageway through the gasket communicating therewith.

FIG. 10 is a view similar in part to that shown in FIG. 5 but embodying the construction shown in FIG. 9 showing the additional seal annulus provided in the door underneath the gasket and showing the interruption in such annulus between the connections for the pressure gauge and pressure source.

FIG. 11 is a view similar in part to that shown in FIG. 9, but showing the additional seal annulus provided in the door gasket rather than in the door itself.

FIG. 12 is a view similar in nature to that of FIG. 10, but embodying the construction shown in FIG. 11 wherein the additional seal annulus is provided in the gasket rather than in the door itself.

FIG. 13 is a perspective view, partially broken away, showing a dust sealing door embodying the construction of the present invention.

FIG. 14 is a perspective view, partially broken away, of a door frame which is utilized in connection with the construction shown in FIG. 13.

FIG. 15 is a view similar in nature to any of FIGS. 3, 4 or 7 showing one type of door gasket and door frame gasket means which may be used with my improved dust sealing door.

FIG. 16 is a modification of the construction shown in FIG. 15.

FIG. 17 is another modification of the means shown in FIG. 15.

FIG. 18 is yet another modification of an apparatus embodying my invention.

FIG. 19 is an elevational view of my improved dust sealing door.

FIG. 20 is a fragmentary sectional view taken in the direction of the arrows along the section line 20—20 of FIG. 19.

FIG. 21 is a partial sectional view taken in the direction of the arrows along the section line 21—21 of FIG. 19.

FIG. 27 is a view similar in nature to FIG. 16, but showing a door assembly being sealed with a gasket of modified "H" cross section adapted to form door and door jamb annuli upon deformation of its extremities, the gasket being shown just at the point of contact between the door and the door jamb.

FIG. 27a is identical to FIG. 27 but showing the deformation in the gasket when the door is fully closed.

FIG. 28 is a modification of the construction shown in FIG. 27.

FIG. 29 is a further modification of the construction shown in FIG. 27 wherein laterally extending projections are provided on the gasket and the gasket mates with a "U-shaped" channel provided on the door jamb.

FIG. 30 is a modification of the construction shown in FIG. 29.

It is to be understood that the invention is not limited in its application to the details of construction and arrangements of parts illustrated in the accompanying drawings, since the invention is capable of other embodiments and of being practiced or carried out in various ways within the scope of the claims. Also, it is to be understood that the phraseology and terminology employed herein is for the purpose of description, and not of limitation.

Further, I wish it known that the term "isolating" as used in the art refers to any type of material, whether one is attempting to seal against the escape of gas, fluid or sound.

Being one long involved in the manufacture of doors of all types, such as overhead doors, vertical lift doors, sliding doors and the like, all of which I had the occasion to make in the form of an isolation door at one time or another, I was well aware that the problem is not how to make an isolation door, but how to provide an easily verifiable isolation door. I immediately recognized that the providing of a door which had to be tested by filling the chamber to be tested with a fluid of any type would provide only a limited solution. Also, that the providing of simply a continuous annulus around the opening would not be satisfactory, as first of all it would only test the one seal leaving the coaming and any penetration of the door untested, and would not even provide a satisfactory test for the one seal, as without any interruptions in the annulus there would be no way to tell which direction the air pressure would travel, and thus no way to tell whether the pressure traveled entirely around the annulus and, therefore, tested all possible areas of leakage. Therefore, I used none of these old ideas, but instead used a combination of different type annuli as best shown in the various figures of the drawings.

Figure 1:
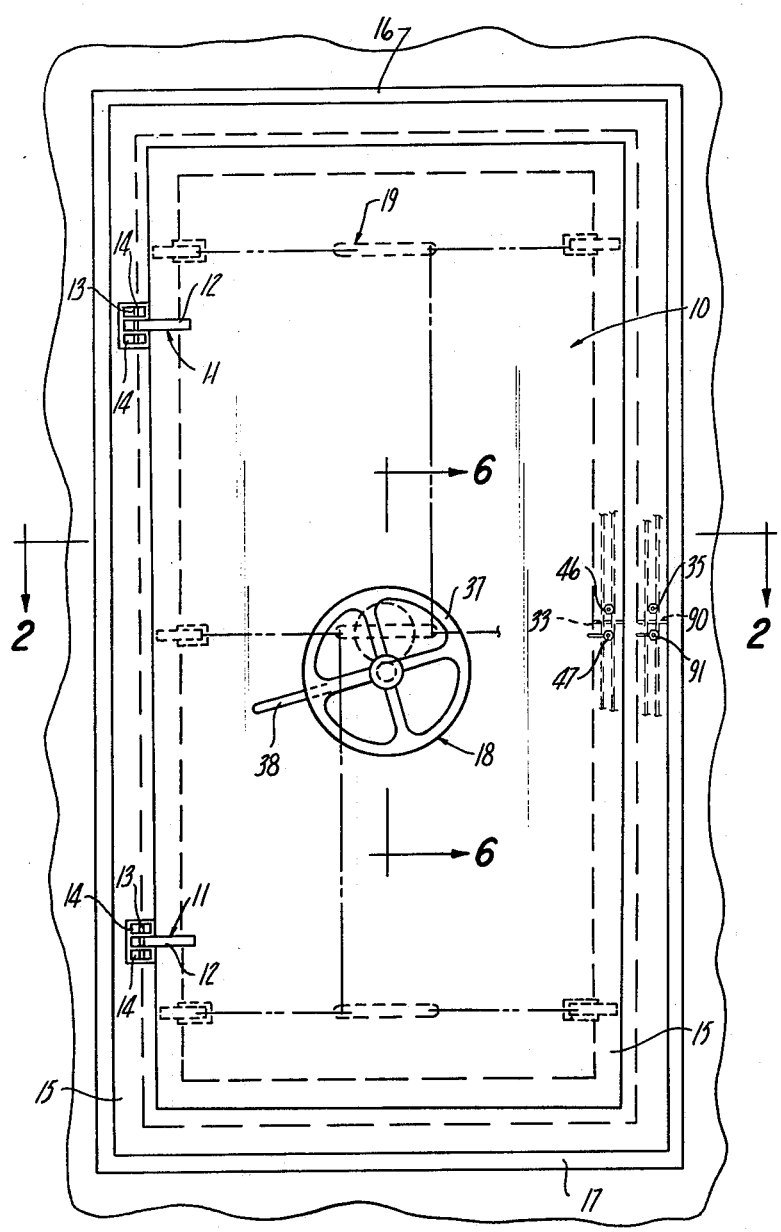
FIG. 1 is an elevational view showing an isolation door assembly embodying the construction of the present invention.

Referring to FIGS. 1 and 2 specifically, a construction embodying my invention is shown therein, and includes first a thick steel door generally designated by the numeral 10. The steel door 10 is, in turn, mounted to two hinge assemblies generally designated by the numeral 11 consisting of the hinge brackets 12 welded to the door 10 and being supported for rotation by the hinge pins 13 in the hinge supports 14. It may be desired that the pins 13 ride in slots in the supports 14 to provide that an even compression is made possible. Another means of providing the same function is by the use of an articulating hinge.

The hinge supports 14 are, in turn, mounted, depending on the direction of swing of the door, on one of the vertical uprights designated by the numeral 15. Vertical uprights are commonly referred to as door jambs, and in combination with the header 16 and the door sill 17 commonly form what is known in the art as the door coaming.

The remainder of the embodiment comprises the door handle assembly generally designated by the numeral 18, and the door locking assembly generally designated by the numeral 19.

In a typical isolation door assembly installation, it is common to find the opening made of concrete or steel or other material which is generally designated by the numeral 23, into which is embedded the door frame 24. The door coaming consisting of the jambs 15, the header 16, and the sill 17 is then welded to the door frame 24 and the door 10 is mounted by way of the hinges to the coaming, with any such assemblies as the door handle assembly 18 penetrating the door 10 completing the assembly.

It can now be seen that there are several possibilities for leakage. These exist at the weld of the coaming to the door frame, at the seal between the door 10 and the coaming, and at the penetration of the door 10 by the door handle assembly 18.

It is obvious that no simple solution to this problem has previously been available which allows testing all these possibilities for leakage simultaneously in an effective and economical manner.

As previously mentioned, a novel feature of my invention resides with the providing of a combination of annuli forming internal testing passageways at critical leakage points. The first of these involves the providing of an annulus 25 around the entire periphery of the door coaming consisting of the door jambs 15, the header 16, and the sill 17, which I will now generally designate by the numeral 26.

Such an annulus may be provided in several fashions if the door framing 24 provides a mounting surface for the coaming in a flat plane, which is critically important for the sealing of the door. If the frame 24 is flat, no shimming of the coaming 26 to the framing 24 is needed, and the annulus may be provided by providing recesses in the coaming 26, as shown in FIGS. 3 and 4, a groove (not shown) may be provided in the frame 24.

As soon as the coaming is entirely welded to the door frame 24 by the two welds designated by the numeral 27, the coaming annulus 25 is provided.

As previously discussed, a pressure can be introduced by any suitable means into the annulus 25, and by the use of any suitable test for leakage, such as a bubble test, or the attaching of an air pressure gauge, the integrity of the welds retaining the coaming 26 to the door frame 24 could be tested.

It should be understood at this point that any type of welding which is suitable for the particular application could be used to retain coaming 26 to the door frame 24. In addition, the coaming could be fastened to the door in any acceptable manner such that pressure could still be applied, such as by bolts, studs or bolts with nuts and washers.

FIG. 8 shows how the coaming 26 may be attached to the door frame 24 by the use of nut and bolt assemblies, generally designated by the numeral 71. In this construction, the coaming annulus 25 is formed by the use of a double row of a suitable gasket material 72 placed a predetermined distance apart sufficient to allow a testing medium to flow freely about the assembly 71. To prevent distortion of the coaming 26 when a variable fastener such as a bolt is used, it is necessary to limit the distance the gasket 72 is compressed. This is accomplished by the use of a bolt spacer 73 and a pair of continuous strip spacers 74. In this manner, when the bolt is tightened, only enough force can be applied to compress the gaskets 72 to the thickness of the bolt spacers 73.

To complete the assembly, an annular sealing washer 75 surrounds the spacer 73 to prevent the escape of the testing medium past the spacer 73 into the bolt hole 63 and past the bolt and nut assembly 71.

It should be understood, however, that regardless of what fastening means are used, appropriate changes must be made in the manner of attaching the coaming to the door frame so that a double seal with an annulus between the seals is established totally surrounding the perimeter, with the exception of the barrier between the testing inlet and outlet, and an appropriate seal, with free space on all sides to be used to seal any penetration of the door coaming 26 and/or framing 24.

If the door frame 24 is not in a completely flat plane, such as in the case shown in FIG. 7, it will be necessary to use shims 22 not only to shim the coaming to assure that it is in a perfectly vertical plane, but to also provide the coaming annulus 25. In this case starting with the highest point of the door frame 24, a shim of a predetermined thickness is inserted, and continuously thicker shims are inserted until the coaming is brought into a perfectly vertical plane, at which time the coaming 26 is welded by way of the welds 27 to the door frame 24, again providing the annulus 25. In this case the shims used are designated by the numeral 22. In a manner similar to that described before, an air pressure introduced into the coaming annulus 25 through the inlet connection 35 will provide a test for the integrity of the weld 27 by checking the air pressure at the outlet connection 91 on the opposite side of the coaming barrier 90.

At this point then, I have described how to test very easily for one type of the three types of leakage previously discussed. The next type of leakage, and one which has provided one of the greatest problems to date, involving the use of the external testing tanks or the filling of the entire cavity which the door is to seal, involves the seal between the door 10 and the coaming 26. I now make a special adaptation of the use of the annulus in the coaming and apply it to the door seal.

To provide the annulus at the sealing surface of the door, a pair of right angle steel angles are mounted in a mutually opposed parallel spaced relationship on the door 10 entirely around the periphery of the door. Such angles are designated by the numeral 28. A sealing material is then poured or otherwise placed between the angles to form a continuous gasket 31. It should be understood that any type of gasket, such as a cord seal, graphite seal, etc. could be used, depending on the particular sealing application of the door and its environment.

On the complimentary surface of the door coaming 26, a similar pair of steel angles 29 are continuously seal welded (not shown) to the coaming in a parallel identically oriented relationship so that the space between the channels on the coaming is less than that on the door. It can be seen that when the door is closed the edge regions 30 of the channels 29 will depress the continuous gasket 31, thereby providing an annulus entirely about the periphery of the door. It can be seen that the angles could be mounted in any orientation and be made of any material suitable for the intended application of the door.

To be certain that the pressure passes entirely around the door annulus 32, an obstruction 33 is placed in the path thereof, as best shown in FIG. 5. If it is desired to simply test the door annulus 32, a pressure gauge 46 would be connected, as shown in FIG. 5, on one side of the obstruction 33, and a pressure source 47 would be connected on the other side at the point indicated. The testing points would be plugged, of course, except during the test. However, when opened and connected, it is obvious that the pressure must travel entirely around the door annulus 32 to reach the pressure gauge, and this would provide a valid test of the door annulus 32.

However, another novel feature of my invention is the fact that not only can the door annulus be tested in this manner, but the door annulus can be tested together with the coaming annulus by the providing of internal passageways between the door annulus 32 and the coaming annulus 25. In this event, connections 35 and 91 would be provided on either side of the barrier 90, and connections 46 and 47 would be eliminated. A pressure gauge would then be connected on one side of the barrier 90, and a pressure source would be connected on the opposite side using inlet and outlet connections 35 and 91, a testing medium would be admitted, and the pressure gauge would be watched for any drop in pressure. In this manner, both annuli can be tested simultaneously.

Such passageways are shown particularly in FIGS. 4 and 7, and could be provided in the construction shown in FIG. 3, if desired. In this manner, door annulus 32 and coaming annulus 25 can be tested in combination, which is something which was not previously possible in the prior art, in a simple, inexpensive and rapid manner, both at the time of the installation of the door, and at any desired intervals thereafter, without having to use the outdated methods of pressurizing a chamber or providing a large tank on the outside of the door, as had to be done before.

Having achieved this significant advance in the art, a novel product was provided, but still not being satisfied, I decided to go ahead and solve the last problem presented, that of how to preserve the integrity of any penetration through the door, such as by the handle used to operate the door locking means. The handle assembly is generally designated by the numeral 18, and operates the door locking assembly 19, as previously described. To be more specific, the door handle assembly 18 could consist of door handles 37, locking levers 38, various connecting links 39, sliding locking bars 40, and guideways 41, which operate in a standard manner with the rotating of the handle 37.

Since such locking mechanisms are very common, and thus old in the art, and any particular configuration of the locking mechanism would depend on the application to which the door is to be put, it is not deemed necessary to describe any particular locking mechanism in any greater detail than has been done heretofore.

What is important in the present invention is that any shaft which penetrates the door 10 be sealed in a particular manner as more particularly described and shown in regard to FIG. 6.

As shown in FIG. 6, it is preferable that the entire locking mechanism be designed so that there is only one penetration of the door by a shaft 42 which will operate the entire assembly. The shaft 42 penetrates the door 10 and has mounted thereon a first small gear 43. A second shaft 45, preferably welded to the door 10 carries a large gear 44 which is operatively mounted on the shaft 45 and adapted to be rotated by the gear 43. The plate 48 maintains the shafts 42 and 45 in a fixed relationship. It is retained in place on the shaft 45 by the bolt and washer assembly 49. The connecting linkage 39 is connected to the large gear 44, and upon the rotation of the gear 44, the linkage 39 then rotates, moving the movable linkage 39 and causing the sliding locking bars 40 to move inwardly releasing their grip on the door coaming 26. This again is fairly standard in the art, and a novel point of the present invention is the particular treatment which the shaft 42 receives at the point where it passes through the door 10.

Instead of just passing through the door, a special bushing 50 is first provided which fits into a complimentary hole provided in the door, designated by the numeral 56. The hole in the door is chosen to be slightly larger than the bushing 50 so that air can pass between the entire periphery of the bushing and the hole. The bushing 50 is provided with a longer threaded bushing portion 52, shown as the right-hand threaded portion in FIG. 6, and a shorter threaded bushing portions 51 shown as the left-hand portion. For reasons to be explained, the longer threaded portion 52 will vary in length according to the thickness of the door, with the threads always beginning intermediate the inner and outer faces of the door. The other portion of the bushing, which could be considered that up to the aperture provided in the bushing at 53, will remain substantially the same length irregardless of the size of the door; the inner face of the door always covers said aperture 53. The packing glands 54 are provided within the bushing 50 to provide an even pressure on the packing 65. The two bushings 55 do not contact each other, but are spaced a distance apart sufficient to allow an air space around the periphery of the shaft 42 between the two bushings 55. At the point where a shaft annulus 58 has been previously provided around the shaft 42, an opening is left in the corresponding bushing 55 which communicates with a second aperture 59 provided in the body of the bushing 50. A pressure connector 60 is operatively connected to the second aperture 59.

A packing is provided between the packing glands 54 and the bushings 55 and is designated by the numeral 65. To complete the shaft assembly, conventional packing nuts 66 are screwed on to the previously provided threaded portions 51 and 52 of the special busing 50 to place pressure against the packing glands 54, the packing 65 and the bushings 55 which provides a seal for the shaft assembly.

It should be noted that to provide the necessary pressure on the packing, the bushings 55 bear against a shoulder region 67 provided within the special bushing 65. The plate 68, which is welded to the bushing 50, also has the shaft 45 welded thereto, and enables the entire doorhandle assembly 18 to be made as unitary structure. The installation of such structure is completed by placing a suitable sealing compound between the plate and the door, inserting the bushing through the hole in the door, placing the lock washer 69 over the bushing 50, and tightening the locknut 70 and then placing and tightening the exterior packing nut 66 on the longer threaded bushing portion 52.

To test for a leak around the shaft penetration, it is now only necessary to introduce a suitable testing medium through the pressure inlet 60. The testing medium will enter the pressure connection 60, travel through the aperture 59 into the annulus around the shaft 58. From the annulus 58 the testing medium is free to pressurize the internal area of the bushing 50 defined by the facing edges of the packings 65 by virtue of said testing medium permeating around the surfaces of the shaft 42, around the bushings 55 and the space between the shoulders 67 with special bushing 50 and the shaft 42.

With the internal area of the bushing 50 pressurized as above, the stage is set for the testing of all possible leak sites of the shaft penetration, these being at both ends of the bushing where it is possible for the packings 65 to leak, letting air escape through the packing glands 54 and the packing nuts 66, and where the assembly 18 is attached to the door by the lock washer 69 and lock nut 70.

Leaks can be tested for at this point by virtue of the test medium being able to pass through the first aperture 53 and pressurize the space between the bushing 50 and the hole 56 at the same time said internal bushing area is pressurized.

To test for leaks of the shaft penetration, one merely introduces an appropriate testing medium into the internal bushing area through the pressure connection 60 until a predetermined pressure is reached, at which time one stops the flow of said medium and attaches a pressure gauge at said pressure connection. If the gauge does not show a pressure drop, there is obviously no leak.

However, if a pressure drop does occur, additional testing medium is again introduced through connection 30 until said predetermined pressure is reached, and a test, such as a bubble test, a sniff test, or other suitable test for leakage is made at all the leak sites to determine where the defective seal is. After locating the defective seal, appropriate repairs may be made.

It is now obvious that all three regions of leakage, the shaft penetration, the door annulus, or in other words the door seal, and the coaming fastening means can be checked merely by making simultaneous pressure connections to the inlet connection 35 and the pressure connector 60, and in this pressure connections to the fitting 35 and the connection 60, and in this way the entire doors integrity, and by this I mean the integrity of all possible leak sites in the entire door assembly, can be easily checked in a matter of minutes, rather than the hours which some of the previous methods would have taken. It also can be seen that it is done in a very simple, inexpensive and efficient manner.

Another benefit of my invention of a novel isolation door assembly is that such a door can be utilized in a new method of providing an instantaneous warning of the loss of integrity of any sealed chamber which can be equipped with an isolation door assembly embodying the construction of my invention.

With this new method, instead of introducing an appropriate testing medium under pressure only when you desire to test the integrity of the door, you now apply it continuously into all the annuli in the door assembly, and by way of a suitable system, continuously monitor the pressure at all three points. As previously, a drop in pressure will signal that a leak is present. However, since the isolation door assembly would most likely not be being watched by a human operator at the exact moment a leak would occur, a warning system, such as a bell, light, buzzer or the like would be connected to said monitoring system, to indicate in a graphic manner the occurrence of a pressure drop. Upon receiving a signal to the effect that a pressure drop has occurred, appropriate personnel may take corrective action.

If the pressure in the annuli is always kept higher than that of the chamber, which is important if a corrosive or otherwise dangerous environment is being contained, any pressure leak will be directed inward, containing such environment.

It should be understood that many pressurizing, monitoring and warning systems are available in the art, and any of such systems which are suitable for the environment being contained may be used.

I have found that the testing of the shaft penetration, the door annulus and the coaming fastening means is an adequate test for pressure leaks in most of the situations encountered which require the installation of an isolation door assembly. However, in particularly critical cases where extra precautions need be taken to seal the door, it has been found desirable to add a seal annulus 100 beneath the continuous gasket 31 in addition to the door annulus 32 and the coaming annulus 25. A plurality of passageways 101 extending through the gasket 31 from top to bottom is provided on either side of the obstruction 102, as best shown in FIG. 10.

The remainder of the construction remains essentially the same, with the door frame 24 embedded into the opening 23, and the coaming generally designated by the numeral 26 being welded to the frame 24 by means of the two welds 27. It is preferable that even though the pressure source 47 and pressure gauge 46 communicate with the door annulus 32 by way of passageways (not shown) through the gasket 31, that a series of the passageways be distributed throughout the extent of the gasket to equalize the pressure in the annulus 100.

An alternate method of providing the additional seal annulus is to place it in the continuous gasket 31 itself, as shown in FIGS. 11 and 12. In this case a seal annulus 103 is provided in the bottom surface of the gasket 31 with passageways 101 communicating with the top surface of the gasket as before. Thus, the seal annulus 103, by virtue of a plurality of passageways 101, is always in communication with the door annulus 32. Thus, when pressure enters the inlet connection 35, it enters the coaming annulus 25, the door annulus 32 and the seal annulus 103 simultaneously. This coupled with the shaft seal mechanism previously described provides an additional sealing test where critical conditions are present. As before, an obstruction 104 must be placed in the seal annulus 103 to ensure that the pressure passes entirely around said annulus.

I have found it also possible to adapt my invention to dust sealing doors as well as to gas-fluid-sound isolation door assemblies. It should be understood that although the following portions of the specification speak mainly of "dust sealing" doors, the classification of a type of seal as a dust-tight seal, or a watertight or sound tight seal is primarily a function of the loading applied to the seal. Therefore, it is clear that any of the constructions to follow may function as a gas-fluid-sound isolation door assembly under the proper loading conditions, just as any of the sealing arrangements to be discussed may be used in the embodiment of the isolation doors previously described.

There is shown in FIGS. 13 and 14 a dust sealing door 105, and a dust sealing door frame 112 which cooperates with said dust sealing door to prevent dust and other small particulate matter from entering rooms sealed therewith. In this embodiment of my invention, the dust sealing door 105 is provided with door annulus 106 which extends around the perimeter of the door at a predetermined distance from the edge thereof except for the door annulus interruption 107. A pressure entry 108 and a pressure exit 109 communicate with the door annulus 106 on either side of the interruption 107.

In a similar fashion, the door frame, generally designated by the numeral 112, is provided with a door frame annulus 110 having a door frame annulus obstruction 111 provided therein. When the door 105 is mated with the door frame 112 and a pressure source (not shown) is connected through the pressure entry 108 and a pressure gauge is attached at pressure exit 109, it can be seen that the door assembly becomes pressurized, and with the addition of suitable gasketing material a dust sealing door assembly with integral testing means may be provided in a manner similar to the isolation door assembly, and be well within the scope of the present invention.

Referring to FIGS. 15–18, there are shown four variations of door gasket and door frame gasket means which may be used to affect the sealing between the door 105 and the door frame 112.

In FIG. 15 there is shown the door 105 having the door annulus 106 therein. On either side of the annulus 106 are mounted a pair of angle irons 117 in an opposed parallel relationship around the entire periphery of the door in any suitable fashion, such as welding and the like. The angle irons 117 are so mounted a predetermined spaced distance apart to accept a door gasket 118 of substantially rectangular cross section which may be secured to the door and the angle irons by gluing or other suitable fastening means. A plurality of passageways 101 on either side of the door annulus interruption 107 (not shown) allows the pressure entering the space 122 between the two gaskets, to be discussed herein below, to pass freely into the annulus 106.

In a similar fashion to the dust sealing door 105, a pair of steel channels 119 of substantially rectangular cross section are mounted by suitable fastening means, such as seal welding and the like, in a vertical upstanding spaced position to accept a specially recessed door jamb gasket 120 having a seal annulus 121 of rectangular cross section provided in the bottom thereof. The seal annulus 121 is in direct communication with the door frame annulus 110. As before, a plurality of passageways 101 on either side of the door annulus interruptions 107 allows pressure to freely communicate with the sealed space 122. Pressure connections in this embodiment of my invention may be made as shown in FIG. 10.

FIG. 16 shows another modification of my invention wherein an inverted U-shaped gasket 123 is mounted to the door frame 112 by virtue of being fastened in a recess 124 provided therein. As before, the door frame annulus 110 is present, and a plurality of passageways 101 are provided at spaced intervals on either side of the door jamp annulus interruption which is not shown. This again allows communication between the door frame annulus 110 and the door annulus 106 which in this case is formed by the cooperation between the dust sealing door 105 and the inverted U-shaped gasket 123.

The door 105 accepts the gasket 123 between a plurality of steel bars 125 fastened about the periphery of the door by suitable fastening means such as the screws 126 or the like. As before, an interruption must be present in the door frame annulus 110 and the door annulus 106, with the pressure source 47 and pressure gauge 46 (not shown) being mounted similarly to that shown in FIGS. 10 and 12, thus allowing for testing of the dust sealing door at any time.

A further modification shown in FIG. 17 shows the use of the gasket generally designated by the numeral 127 and having an H-shaped cross section. In this case two sealed spaces 128 and 129 are provided, with the door frame annulus 128 being provided by virtue of the upper legs 130. One extremity of the gasket forming a door frame annulus between the upper legs 130 and the dust sealing door frame 112.

Similarly to that shown in FIG. 16, a pair of steel bars of rectangular cross section identified by the numerals 125 are fixedly attached to the door 105 by suitable fastening means such as screws 126, and a door annulus 129 is formed. An obstruction similar to those in FIGS. 10 and 12 would necessarily have to be provided in both the door and door frame annuli as before for the testing method of the present invention to work properly, with the pressure gauge 46 and pressure source 47 (not shown) being mounted on either side of such obstruction in a manner similar to that shown in FIGS. 10 and 12.

Another modification is shown in FIG. 18. A plurality of steel bars of rectangular cross section 125 are mounted in opposed pairs to the dust sealing door 105 and dust sealing door frame 112 in a predetermined spaced relationship by fastening means such as screws 126. In the recesses provided by the rectangular bars there is suitably mounted by glue or the like in a 180° opposed relationship a pair of substantially rectangular gaskets having upper and lower mating recesses 131 and 132, respectively. As before, a plurality of passageways 101 allow communication between a sealed space 122 and the frame annulus 110 and door annulus 106 to allow for testing of leaks in all possible areas. In addition, as before, an interruption (not shown) would have to be provided in the sealed space 122 and the pressure gauge 46 and the pressure source 47 would be mounted as before.

An advantageous embodiment of my invention can be seen by referring to FIG. 19 wherein there is shown a cut-away elevational view of a dust sealing door with integral testing means. The door frame assembly, generally designated by the numeral 112, consists of the door jambs 133, the header 134 and the sill 135. In this embodiment the door jambs and the header are all made of a U-shaped channel suitably fastened to the angles 136 and the face plate 137, and extends around the periphery of the door except for the bottom thereof. The header and jambs may be seal welded or sealingly fastened by other means to the angle 136 and the face plate 137, with these plates being bolted or otherwise suitably fastened to the concrete walls 138.

The door sill 135, also made of U-shaped channel, is embedded in concrete with a ramp 139 leading up to the top of the sill 135, and a rear mounting surface 140 being attached thereto. The dust sealing door 105 is hingedly mounted by the hinges 141 to one of the door jambs 133.

As previously described, the sealing on the top, bottom and sides of the door may take many forms including any of those described in FIGS. 15-18. An additional method of sealing which has proven particularly advantageous in dust sealing doors is shown in FIGS. 20 and 21, wherein instead of a flat gasket, or those such as shown in FIGS. 15-18, a gasket 142 with a substantially triangular cross section is used, with the hypotenuse 142a thereof forming the sealing surface. The right angle portion 142b of the gasket abuts steel channels welded or fastened by suitable means to the door and designated by the numeral 143. The steel channels 143 are, in turn, seal welded about the periphery of the door 105. An angular sealing channel 144 is, in turn, mounted on the side and top of the door assembly by being seal welded to the door jambs 133 and the header 134 as shown best in FIG. 20. At the bottom of the door, the gasket 142 is sealingly mounted in the right angle formed by the door 105 and channel 143, which is seal welded to the bottom of the door 105. In this case, the hypotenuse 142a seals against the rear mounting surface 140. It can be seen that an annulus 103 is provided around the entire gasket and a door annulus 106 is provided under the gasket about the entire periphery of the door. It can be seen that when the door 105 is closed and held in place by the locking assembly, generally designated by the numeral 145, the gasket 142 will compress somewhat, effecting a seal between the gasket 142 and the angular sealing channel 144 on the sides and top of the dust sealing door 105, and the rear mounting surface 140 on the bottom of the door.

If the steel channels 143, sill 135, door jambs 133 and header 134 are all seal welded and such welds are tested before installation of these parts, the only possible place for leakage to occur is between the hypotenuse 142a of the gasket 142 and the angular sealing channels 144, or mounting surface 140, or under the gasket. To test for leakage a pressure source 47 and a pressure gauge 46 can be connected by suitable means in a manner similar to the previously described. Of course, as before, an interruption (not shown) must be provided in the seal annulus 103, and the door annulus 105 suitable testing means attached.

Figure 22:
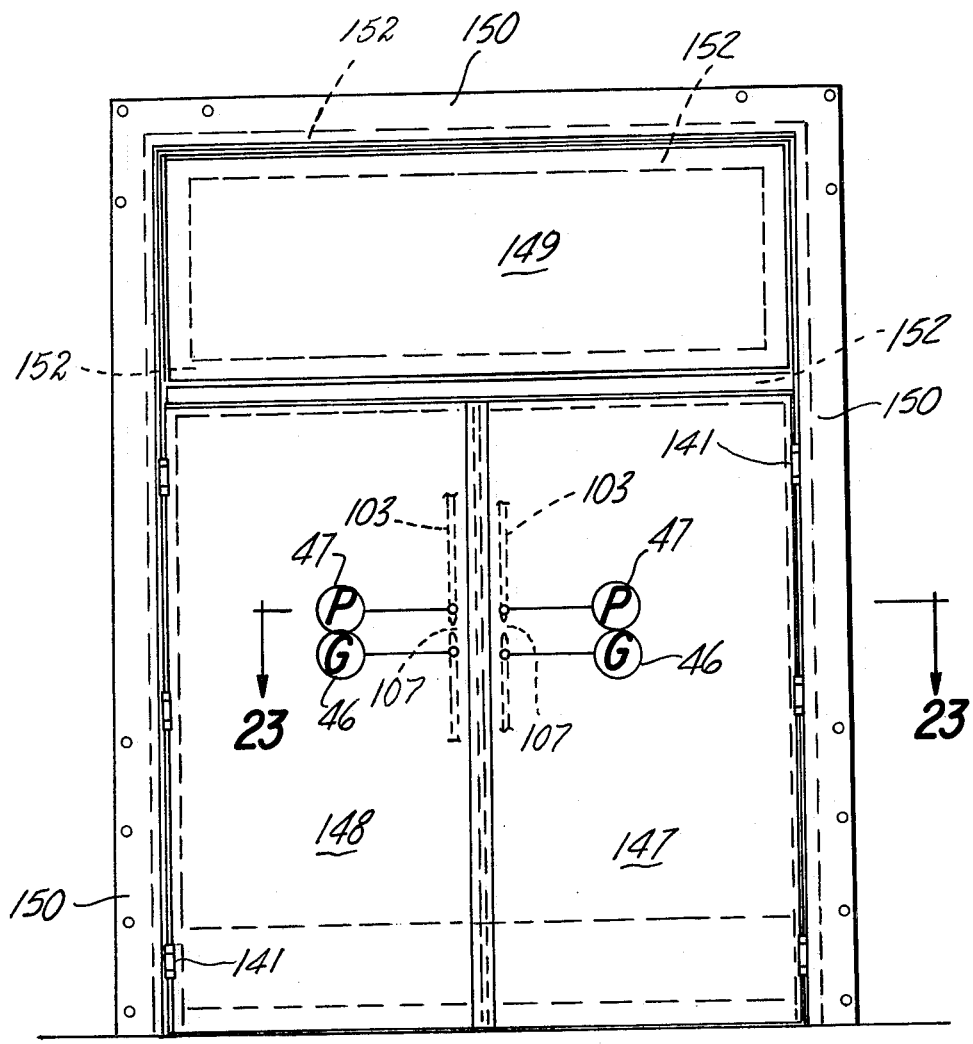
FIG. 22 is an elevational view of a modification embodying my construction when a double hung dust sealing door is to be used.
Figure 23:
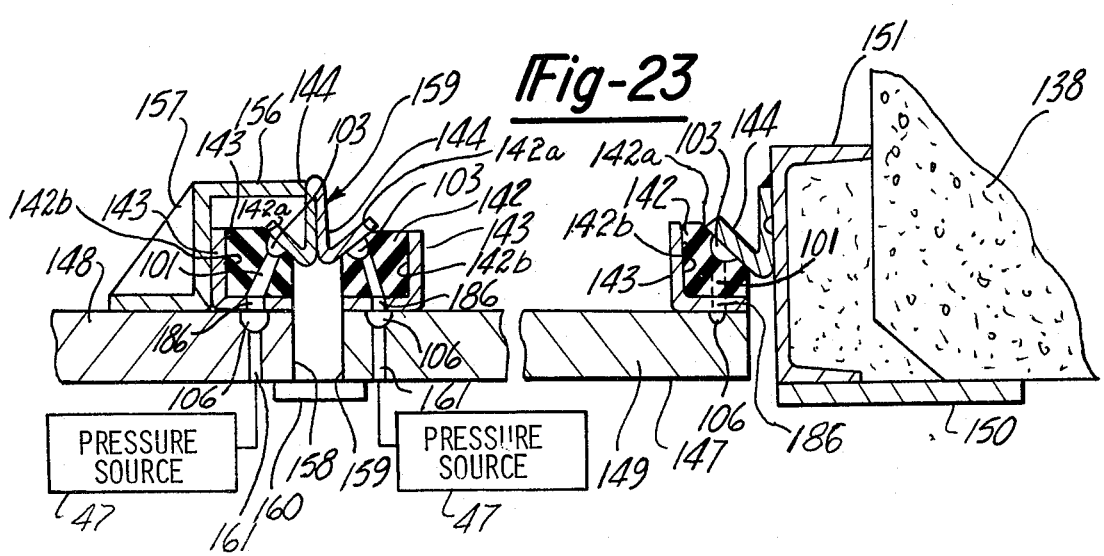
FIG. 23 is a broken away sectional view taken in the direction of the arrows along the section line 23—23 of FIG. 22.

An embodiment of the present invention which may be used when a double door is involved is shown in FIGS. 22 and 23. In this case a right hand door 147 and a left-hand door 148 are hingedly mounted to the door jambs 133. A transom 149 may also be provided. As before, a face plate 150 is provided about the side and top of the door to which a pair of door jamps 151 and a pair of headers 152 are secured. The sealing construction may be the same as before with the face plate 150 bolted or otherwise secured to the concrete walls 138, and the door jambs 151 being of a U-shaped construction partially embedded in concrete walls 138 and fastened by suitable means to the face plate 150. The doors contain a plurality of right angle steel channels 143 seal welded about the periphery thereof which abut an angular sealing channel 144 seal welded to the jambs 151 and header 152. Again the annulus 103 is provided about the entire periphery of the gasket 142 on the hypotenuse 142a thereof. To seal the only remaining opening, that between the doors 148 and 147, a double right angle channel 156 with a suitable reinforcing web 157 is seal welded to the inner surface of the door 148 a predetermined distance from the edge 158 thereof depending upon the size of the seals demanded for the particular application. A double sealing channel generally designated by the numeral 159 consists of a pair of angular sealing channels 144 placed back to back and are, in turn, seal welded to the double right angle 156.

Such a construction may either be one piece, as shown, or consist of a pair of steel channels 144 seal welded together and tested before installation. A pair of right angle steel channels 143 are seal welded about the periphery of the doors 148 and 147. A pair of door annuli 106 are provided under said channels 143 about the entire periphery of the doors 148 and 49 and communicate with the annulus 103 by way of a plurality of holes 186. An alignment plate 160 may be attached to either of the doors to aid in the alignment of the doors when closed. As before, the sill 135 is provided with a rear mounting surface 140. It is clear that when one of the doors is fastened in place and the other place is closed and held by a suitable latch means, both of the gaskets 142 will be compressed against the double sealing channel 159. Since the double right angle channel 156 and the double sealing channel 159 are all pretested, this leaves as the only place for leakage the surface between the hypotenuses 142a of the gaskets 142 and the sealing surface of the double sealing channel 159 and underneath steel channels 143. Since a seal annulus 103 is provided in these gaskets, together with the door annulus interruption 107, the seal may be tested by the method of the present invention. A pressure source 46 is provided for each door and communicates by way of the holes 186 and passageways 101 and 161 with the annulus 103 and 106. As before, the annulus 103 extends around the entire periphery of the door until it meets the door annulus interruption 107 and immediately on the other side of the interruption 160, pressure sources 47 are provided. Upon the introduction of the pressure by the sources 47 into the annulus, the air will travel around the entire periphery of the door providing there are no leaks, and will enter the pressure gauges 46 in a manner similar to that described before.

Figure 24:
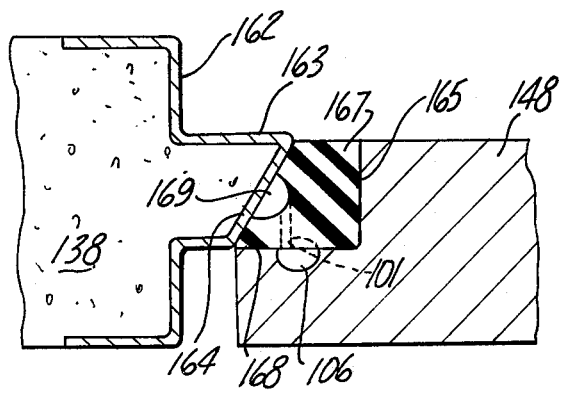
FIG. 24 is a partial sectional view showing a modification of the door jamb construction shown in FIG. 23.
Figure 25:
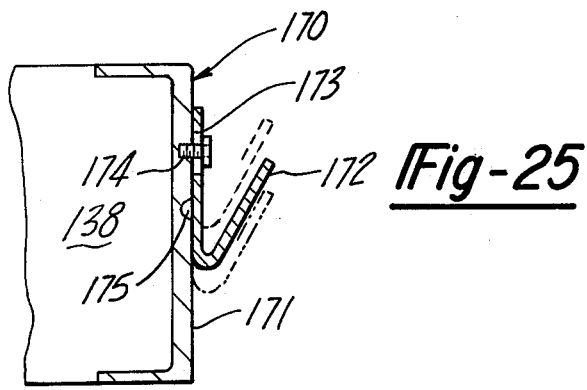
FIG. 25 shows yet another modification of the door jamb construction shown in FIG. 23, and is desirable when an adjustable door jamb is needed.

Referring to FIG. 24, a modification of my invention is shown. In this embodiment, a modified jamb 162 is embedded in the concrete walls 138. Integrally formed on the jamb 162 is a trapezoidal extension 163 having a sealing surface 164 provided therein. A right angle recess 165 is provided in what otherwise would be the rear corner of a door, and into this recess is sealingly mounted a gasket of a complimentary shape to the extension 163 and having a mating sealing surface 168. When the door is closed, it is obvious that the only place for dust leakage to take place is along the joint formed by the sealing surfaces 164 and mating sealing surface 168 or under the gasket 167. Following the sealing principles discussed above, an annulus 169 is placed in the gasket 167 about the entire periphery of the door as is the door annulus 106, both of which communicate together by a plurality of passageways 101 and by introducing pressure into the area defined by the annulus and passing around the entire periphery of the door until an interruption (not shown) is met, sealing is effected in a manner similar to that described before. With suitable pressure gauge 46 and pressure source 47 is connected on each side of the interruption an integral sealing means is provided for my dust sealing door 105. It is obvious that this modified construction may also be used for the door header and door sill, if desired.

A further modification to the jamb which may be used when the door assembly shown in FIG. 24 is used is the adjustable door jamb assembly generally designated by the numeral 170. Such an assembly consists of a substantially U-shaped channel 171 embedded in concrete wall 138, or mounted by suitable fastening means to whatever the building material happens to be. An angular sealing channel 172 is provided with a slot 173 by which it is slideably mounted to the channel 171 by suitable fastening means such as the bolt 174. To make sure that there is not dust or air leakage under the angular sealing channel 172, a jamb annulus 175 is provided which communicates with suitable testing means. A suitable interruption (not shown) is provided in the jamb annulus 175 and the pressure gauge 46 and a pressure source 47 are provided on either side of the jamb annulus as previously discussed.

It is, of course, to be understood in any of the modifications just discussed it is entirely possible to interconnect the passageways leading to the pressure gauges and the passageways leading to the pressure sources so a single connection may be made to test an entire door assembly similar to that shown in FIGS. 4 or 7.

Also, it should be understood that even though most of the illustrations show a door frame and/or its component parts mounted in concrete, my invention may be used in any type construction where isolation and/or dust sealing doors are required.

Figure 26:
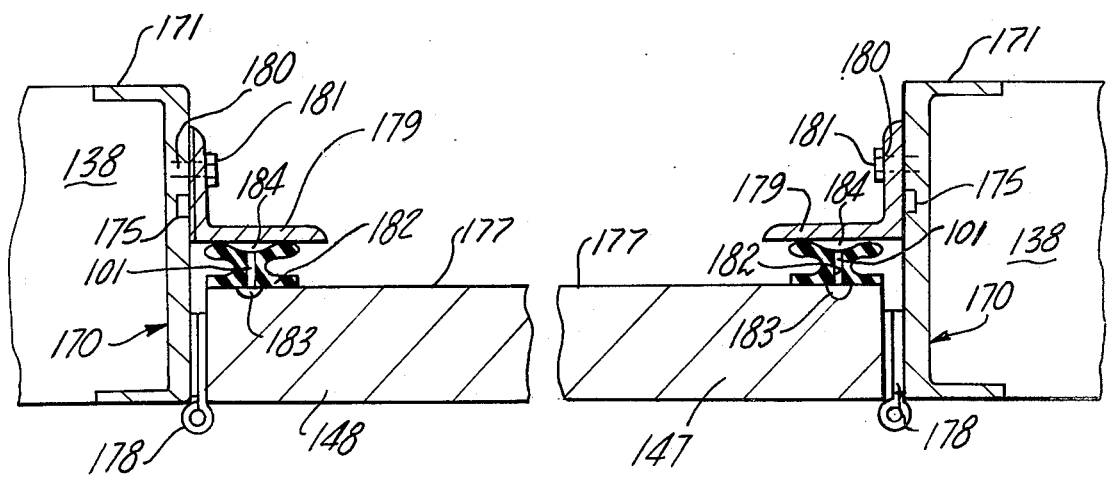
FIG. 26 shows a modification of the adjustable door jamb construction shown in FIG. 25.

Another modification of my dust sealing door which provides for an adjustable door jamb is shown in FIG. 26. As before, a substantially U-shaped channel 71 is mounted to the door opening made of concrete, as indicated by numeral 138. The doors 147 and 148 are mounted to the door jambs 170 by means of the hinges 178, and adjustable right angles 179, having slots 180 therein, are fixedly, but movably, mounted to jambs 170 by means of the bolts 181. In this case, the means to effect the seal between the right angles 179 and the doors takes the form of a modified H-shaped gasket 182 sealingly mounted to the doors 147 and 148 and adapted to be compressed between the inner door surface 177 and the right angle 179 when the door is closed. There is thus formed the frame annulus 184 which communicate through passageways 101 with the door annulus 183. As before, the jamb annulus 175 is in the U-shaped channel 171 which is capable of communicating with suitable testing means. With the provision of a suitable interruption (not shown) in the door annulus 183, the frame annulus 184 and the header annulus 175 as previously described, together with suitable connections for a pressure gauge 46 and a pressure source 47, it can be seen that we have now provided another modified dust sealing door with integral testing means.

Having now shown how my invention may be applied to isolation door assemblies of various types when a rather high pressure load is applied to the seal between the door and door frame, and having also described how this same principle of providing an annulus with an interruption therein and means to admit a test pressure and to attach a pressure gauge on either side of said interruption wherever the possibility of leakage occurs where a lower pressure load is to be expected, such as in the application of my construction to dust sealing doors previously described, I now wish to describe a particular type of combination door gasket and door frame gasket means which I have found to be particularly advantageous whether applied to gas-fluid-sound isolation door assemblies or to dust sealing door assemblies or, indeed, to any type door which has to have a reliable sealing means with an integral and reliable testing means for testing the integrity of such a seal.

Referring to FIG. 27, there is shown a construction very similar to many of the proceeding figures wherein there is provided a door 205 which abuts a door frame 210 and there is provided therebetween a gasket having a specially modified H-shaped cross section generally designated by the numeral 190, having upper legs 191, and lower downwardly and inwardly extending legs 192. The gasket may be held between a pair of right angles 193 which have been seal welded to the door 205. As before, to test for leakage between the gasket 190 and the door 205, a rectangular annulus 201 is provided between the upper legs 191, which now act as the door annulus. An annulus interruption (not shown) is placed in an appropriate location within the rectangular annulus 201, with the necessary pressure source 47 and pressure gauge 46 provided on either side of said annulus interruption, also not shown. In this modification of the invention there is no need to provide a separate door annulus 106 because of the annulus 201 in the gasket 190. However, as before, it is desirable to place a plurality of passageways 101 in gasket 190 which communicate between the rectangular annulus 201 and the seal annulus 194. While the gasket is somewhat similar in appearance to the gasket 127 shown in FIG. 17, and the lower legs of the gasket 192 do provide for an annlus similar to the second sealed space 129, there is a difference in performance. A comparison between FIG. 27 and FIG. 27a shows the definite advantage of the cross section of the gasket 190.

It can be seen that the lower legs 192 extend in a downward direction and are curved somewhat inwardly upon themselves in FIG. 27, and as the door is brought to its closed position, shown in FIG. 27a, these legs 192 curve even more inwardly on themselves to firmly contact the surface of the door frame 210 and provide the seal annulus 194 having a substantially circular shape as the tips 195 of the legs 192 approach each other. In the closed position shown in FIG. 27a, the tips 195 are even closer together and this circular shape is even more pronounced.

Of particular advantage to this cross section is the fact that the gasket 190 sealingly deforms more readily than the gasket 127, and at the same time, because of the inwardly pointing legs 192, the forces necessary to cause a loss of sealing would be much greater than that needed for the gasket 127 because of the necessity first to deform the gasket legs 192 to the vertical position, and then additionally deform them to cause loss of pressure. Since the gasket shown in 190 may be preferably made of silicone rubber, or a similar material, which is very difficult to deform, a much higher pressure is needed to cause a leakage in this modification of the gasket than that shown in FIG. 17.

The modifications shown in FIGS. 27 and 27a are perfectly acceptable for any application where light to moderate pressures may be applied to the gaskets, such as in the dust sealing doors previously described. It is contemplated that higher pressure applications will be encountered, and the modification shown in FIG. 28 is one embodiment of my invention which may be used for higher pressure applications. In this modification, the additional right angles 196 entrap the gasket between a channel formed therewith to provide additional resistance to deformation of the legs 192 of the gasket, making it extremely difficult to cause a leak therein. It can be seen that in accordance with my method of testing, if the pressure in the circularly shaped seal annulus means 194 is kept higher than either one or both of the surrounding pressures, and the pressure in the seal annulus 94 is continuously monitored, an immediate indication of any leak, should one occur, would immediately be given and corrective action could be taken.

An additional modification of this construction is shown in FIG. 29, where the pair of right angles 193 are reversed, in effect forming a wider trough there between, and a larger door annulus 201 is provided. A U-shaped channel 197 is used to provide the lateral support instead of the right angles 196. In addition, laterally extending flanges 198 are provided on the gasket to provide additional sealing surfaces against both the right angles 193 and the extremities of the U-shaped channel 197 in the event that too much pressure is applied between the door 205 and the door frame 210 causing the U-shaped channel 197 to contact the gasket 190.

FIG. 30 shows a modification of FIG. 29 where the laterally extending flanges 198 are provided on the gasket 190, but showing the right angles 193 again reversed and the U-shaped channel 197 also being replaced by a pair of right angles 196. As before, the trough between the right angles 193 retains the gasket 190 in place, together with suitable attaching means, such as glue and the like, and the right angles 196 provide additional resistance to deformation of the legs of the gasket 192 making for a very effective sealing arrangement. The plurality of passageways 101 are provided between the rectangular annulus 201 and the circular seal annulus 194.

Where the above modifications of my invention can be used, it is clear that a considerable economy in manufacture of constructions embodying my invention is present due to the fact that the rectangular door annulus 201 and the seal annulus 194 now are formed by the gasket 190 itself, rather than being separately provided in the door and door frame 205 and 210, respectively.

It can also be seen that depending on the loading conditions these modifications may be used to effect any type of seal whether it be the isolation type of seal described in the beginning of the present application, or the dust sealing door seal described later in the specification and be well within the scope of the claims of the present invention.

Thus, by abandoning the old methods of testing doors, which involves filling chambers entirely with water, or mounting large tanks on the outside of the doors on flooding compartments in which they are being used, I have provided means to test any penetrations of the doors by any shafts, or the like, means to test the seals of the doors and the fastenings around the coaming of such doors in a simple, easy, and inexpensive manner, thus making a significant advance in the art.

I claim:

1. An isolation door assembly including in combination a door frame, a door coaming adapted to be attached to said door frame in a flat plane, means to attach said door coaming to said door frame in said flat plane in such a manner as to provide a continuous sealed coaming annulus there between, closeable means to admit pressure into said coaming annulus, a door hingedly mounted to said coaming, a sealing surface mounted about the periphery of said door, a complimentary sealing surface provided on said door coaming and adapted to provide a continuous sealed door annulus, closeable means to admit a test pressure into said door annulus, a sealing annulus means adapted to provide a continuous annulus underneath said sealing surface, means to permit pressure to enter said sealing annulus from said door annulus, a door locking assembly operatively mounted to said door having at least one shaft penetrating said door, means to seal said shaft, and means to test said shaft seal.

2. The device defined in claim 1, and including means to interrupt said coaming annulus at a single point immediately adjacent said pressure admitting means.

3. The device defined in claim 2, and including means to attach a pressure testing device immediately adjacent the side of said coaming annulus interruption opposite said pressure admitting means.

4. The device defined in claim 1, and including means to interrupt said door annulus at a single desired point immediately adjacent said test pressure admitting means.

5. The device defined in claim 4, and including means to attach a pressure testing device immediately opposite said door annulus interruption.

6. The device defined in claim 1, wherein said door and said coaming annuli are interconnected and suitable testing means are supplied to test said door annulus and said coaming annulus simultaneously.

7. The device defined in claim 1, wherein said means to attach said door coaming to said door frame include shims placed between said coaming and said framing until said coaming is completely flat, fastening means sealingly attaching said frame and also holding said shims in place, and thereby providing said annulus.

8. The device defined in claim 7, wherein said fastening means are in the form of nut and bolt assemblies, each operatively mounted through holes provided in said coaming and said frame, a pair of strip spacers mounted one each outside of said annulus parallel to said gaskets around the entire periphery of said coaming to limit the compression thereof, a bolt spacer placed over said bolt and between said coaming and said framing to prevent distortion of said coaming upon tightening, and a sealing washer adapted to be placed over said bolt spacer and to be compressed between said coaming and said framing means, thereby sealing the penetration by each bolt and nut assembly.

9. The device defined in claim 7, with said shims being of a metallic material placed continuously around the peripheries of the joint between said frame and said coaming to form said annulus, and said fastening means being in the form of continuous weldments.

10. The device defined in claim 7, with said door frame being completely flat, thus eliminating the need for shimming, and said coaming annulus being formed solely by a recess being provided in said coaming on the appropriate surface, and said fastening means being continuous weldments.

11. The device defined in claim 7, wherein said sealing surface mounted about the periphery of said door includes a plurality of right angle channels seal welded about the periphery of said door in a mutually opposed parallel spaced relationship to form a trough there between, and a sutable gasket material appropriately retained in said trough.

12. The device defined in claim 11, wherein said gasket material is poured rubber.

13. The device defined in claim 12, wherein said gasket material is poured silicone rubber.

14. The device defined in claim 11, wherein said gasket material is graphited material.

15. The device defined in claim 11, wherein said complimentary sealing surface is formed by a plurality of right angle steel angles seal welded about the inner periphery of said coaming in an identically oriented parallel spaced relationship and adapted to mate with said gasket material when said door is in its closed position.

16. The device defined in claim 15, wherein said shaft sealing means include a large bushing adapted to receive said shaft and having a shaft receiving portion of a diameter larger than said shaft and being adapted to receive packing glands, packings and bushings and having a shoulder portion provided therein and being sealingly fastened in a hole provided in said door, with said hole being slightly larger than said bushing.

17. The device defined in claim 16, wherein said bushing has a first aperture provided therein in communication with the interior of said bushing at the shoulder portion thereof proximate the inner face of said door.

18. The device defined in claim 17, with said bushing being provided with a shorter threaded bearing portion and a longer threaded bearing portion, both being adapted to receive a packing nut.

19. The device defined in claim 18, and including an annulus being provided on said shaft and a second aperture being provided in said bushing proximate the position of said annulus when said shaft assembly is completed.

20. The device defined in claim 19, with said shaft assembly having a bushing on each side of said shoulder portion, said bushing having an aperture proximate said second aperture where needed, a packing adjacent said bushing, a packing gland adjacent both packings, with said shaft being passed through both sets of said bushings, packings and packing glands, and a pair of packing nuts fastened to said threaded portions of said bushings.

21. The device defined in claim 20, with said bushing being secured in said hole in said door by an additional washer sealing secured to said second larger threaded portion of said bushing and bearing on said outer face of said door.

22. The device defined in claim 21, and including a pressure fitting removably connected to said second aperture.

23. The device described in claim 22, wherein said pressure fittings said pressure source and said pressure connection are adapted to receive a test pressure simultaneously.

24. The device defined in claim 7, with said door frame being completely flat, thus eliminating the need for shimming, and said coaming annulus being formed solely by providing a recess in said door frame.

25. The device defined in any claims 1–24, wherein said sealing annulus means include an annulus in said sealing surface at the portion of said sealing surface adjacent said door and extending about the entire periphery of said door with suitable means interconnecting said sealing annulus means and said door annulus.

26. The device defined in any of claims 1–24, wherein said sealing annulus means includes an annulus provided about the entire periphery of said door immediately underneath said sealing surface, and means interconnecting said sealed annulus means with said door annulus.

* * * * *